United States Patent [19]
Gutierrez

[11] Patent Number: 5,359,802
[45] Date of Patent: Nov. 1, 1994

[54] FISHING ROD HOLDER

[76] Inventor: Manuel Gutierrez, 1273 Meadow Sweet Rd., Golden, Colo. 80401

[21] Appl. No.: 86,734

[22] Filed: Jul. 2, 1993

[51] Int. Cl.$^5$ ............................................. A01K 97/12
[52] U.S. Cl. .......................................... 43/16; 43/15; 43/21.2
[58] Field of Search ..................... 43/15, 16, 21.2, 17

[56] References Cited

U.S. PATENT DOCUMENTS

| | | | |
|---|---|---|---|
| 693,071 | 2/1902 | Ruud | 43/15 |
| 2,317,445 | 4/1943 | Davidson | 211/70.8 |
| 2,744,351 | 5/1957 | Smith | 43/16 |
| 2,784,517 | 3/1957 | Mooney | 43/16 |
| 2,944,361 | 7/1960 | Coulter | 43/16 |
| 3,410,015 | 11/1968 | Garcia | 43/15 |
| 3,570,793 | 3/1971 | Shackel . | |
| 3,837,109 | 9/1974 | DeJulio . | |
| 3,973,346 | 8/1976 | Mason . | |
| 3,979,852 | 9/1976 | Johnson | 43/16 |
| 4,476,645 | 10/1984 | Paarman | 43/15 |
| 4,823,493 | 4/1989 | Gray | 43/15 |

Primary Examiner—P. Austin Bradley
Assistant Examiner—James Miner
Attorney, Agent, or Firm—Dean P. Edmundson

[57] ABSTRACT

A fishing rod holder is described for supporting a fishing rod and automatically lifting the rod in response to pulling motion on the fishing line carried by the fishing rod. The apparatus includes a hinged tubular receiver for receiving the handle of a fishing rod, an upright stand, a spring connected between the tubular receiver and the stand, an arm which extends forwardly of the stand, a latch attached to the tubular receiver, and a trigger carried on the arm and engaging the latch on the tubular receiver. The sensitivity of the trigger can be adjusted.

15 Claims, 6 Drawing Sheets

FISHING ROD HOLDER

FIELD OF THE INVENTION

This invention relates to fishing rod holders. More particularly, this invention relates to fishing rod holders which are adapted to sense pulling on the fishing line and set the hook on a fish.

BACKGROUND OF THE INVENTION

Fishing rod holders have been previously described for the purpose of supporting a fishing rod and then lifting the rod in response to a pull on the fishing line. See, for example, U.S. Pat. Nos. 3,837,109 (DeJulio) and 3,973,346 (Mason). Such patents describe a tubular receiver for receiving the handle of a fishing rod. The receiver is pivotably supported on a stand and a strong spring is connected between the rearward end of the receiver and the stand. The fishing line extends around a trigger or release arm which moves when a fish strikes the line. This enables the spring to abruptly cause the tubular receiver to pivot upwardly and quickly raise the fishing rod. Such devices do not provide for adjustment in the sensitivity of the actuator mechanism, however. Furthermore, such devices do not include means for controlling the extent of pivotal movement of the tubular receiver.

U.S. Pat. No. 4,407,089 (Miller) describes a fishing rod holder which includes an attachment for setting the hook when a fish strikes the line. The attachment is secured to the fishing rod forwardly of the handle and includes a hinged arm which is caused to move upwardly by a spring in response to pulling on the line. This device is cumbersome to use and does not allow for easy detachment of the device from the fishing rod.

U.S. Pat. No. 3,570,793 (Shackel) describes a fishing rod holder which includes a tubular receiver for receiving and supporting the handle of a fishing rod. A spring-biased keeper prevents removal of the rod from the holder. However, this rod holder does not include any mechanism for setting a hook in response to pulling on the line.

There has not heretofore been provided a fishing rod holder having adjustable means for setting the hook on a fish which tugs on the line, nor has there been provided a fishing rod holder having the other advantages provided by the present invention.

SUMMARY OF THE INVENTION

In accordance with the present invention there is provided a fishing rod holder for supporting a fishing rod and automatically lifting the fishing rod in response to pulling motion (e.g., a fish eating bait on the hook) on the fishing line carried by the fishing rod. In one embodiment the fishing rod comprises:

(a) a tubular receiver having forward and rearward ends; wherein the forward end is open to slidably receive and support a fishing rod;

(b) an upright stand member having upper and lower ends; wherein the rearward end of the tubular receiver is hingedly attached to the upper end of the stand member and is movable between lower and upper or raised portions;

(c) spring means having first and second ends; wherein the first end is secured to the rearward end of the tubular receiver, and wherein the second end is attached to the stand member in a manner such that the tension in the spring means may be adjusted; wherein the spring means biases the tubular receiver toward its upper or raised position;

(d) an elongated arm member having first and second ends; wherein the first end of the arm member is secured to the upper end of the stand member; wherein the arm member projects forwardly from the stand member;

(e) latch means carried by the tubular receiver;

(f) trigger means pivotably carried by the second end of the arm member; wherein the trigger means is movable between (!) a first position engaging the latch means when the tubular receiver is in its lower position; and (2) a second position out of engagement with the latch means; wherein the trigger means is movable from its first position to its second position by the pulling force on the fishing line; and (g) sensitivity adjustment means for adjusting the amount of force required to move the trigger means from its first position to its second position.

The fishing rod holder of the invention is easy to use and it is very versatile because it enables the sensitivity of the trigger means to be adjusted, as desired. This enables the fishing rod holder to be easily and readily adapted for different types of fishing (e.g., for use in a boat, or on land, or for ice fishing, etc.) where the size of the fish and other factors may have an effect on the desired sensitivity for triggering the device.

Other advantages of the apparatus of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
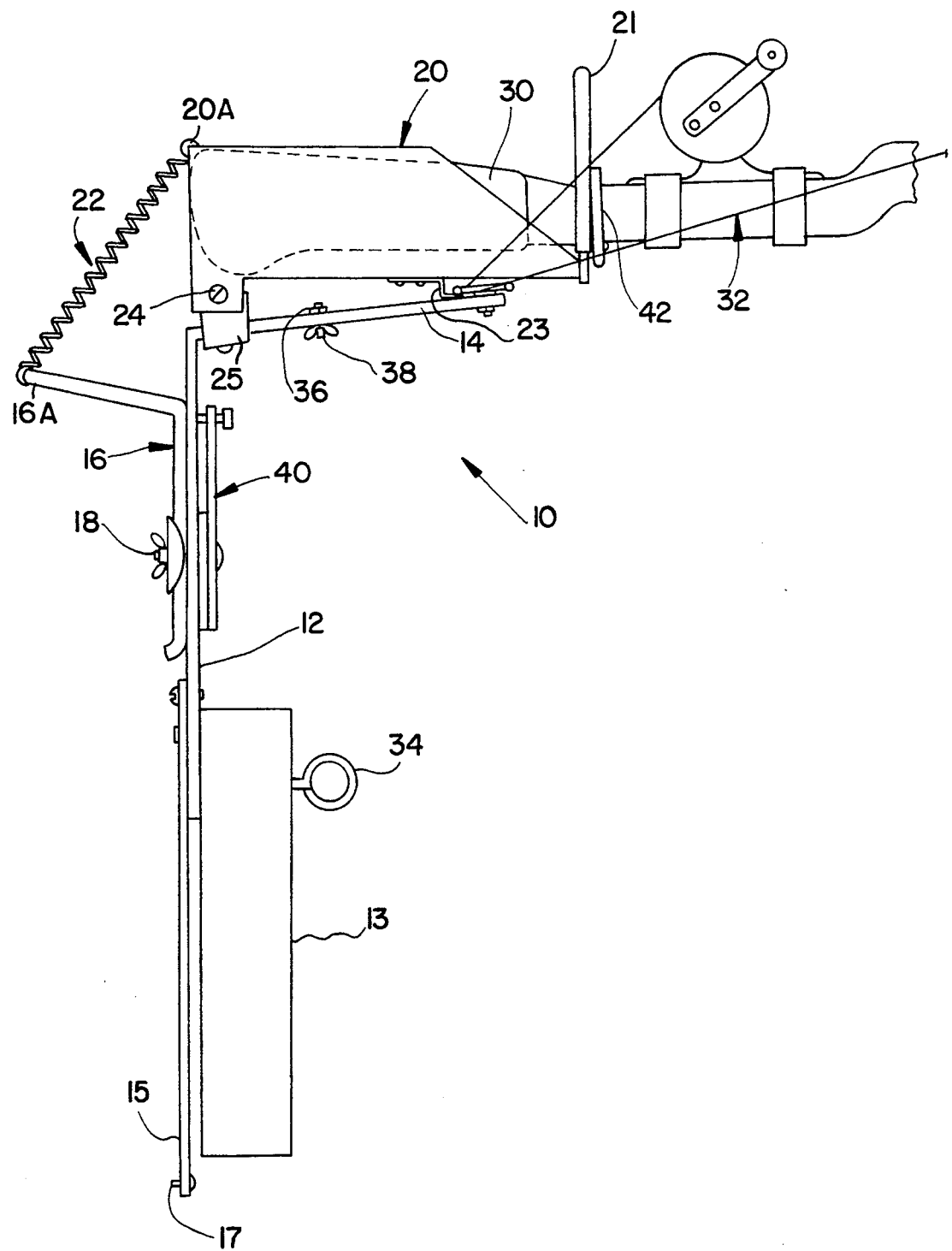
FIG. 1 is a side elevational view illustrating one embodiment of fishing rod holder of the invention.
Figure 2:
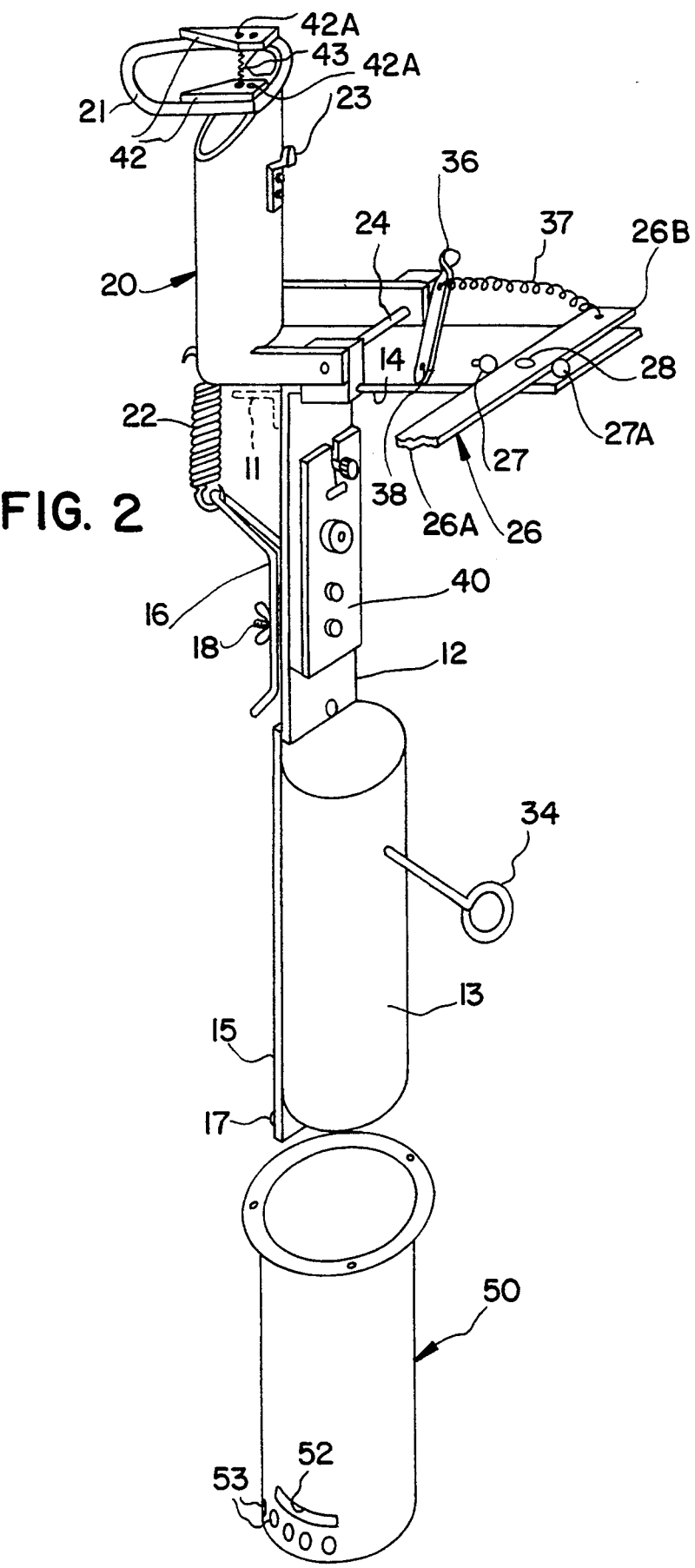
FIG. 2 is a perspective view of the fishing rod holder of FIG. 1.
Figure 3:
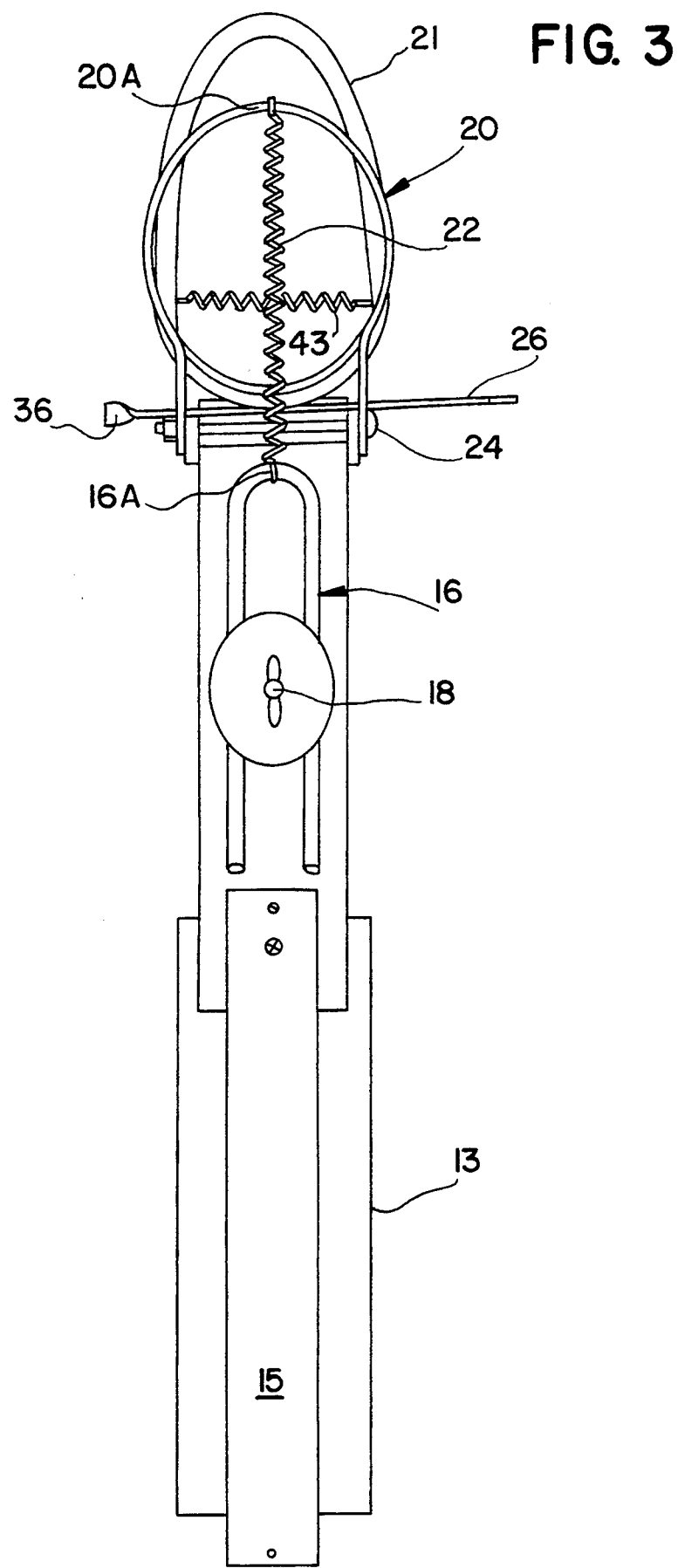
FIG. 3 is a rear elevational view of the fishing rod holder shown in FIG. 1.

In FIGS. 1-3 there is illustrated one embodiment of fishing rod holder 10 in accordance with this invention. The apparatus comprises an upright stand member 12, a tubular receiver 20 having a rearward end pivotably attached to the upper end of the stand member 12, and spring means 22 connected between the rearward end 20A of the tubular receiver and the outer end 16A of an arm 16 which extends rearwardly from the stand member 12 and which is adjustably movable in a vertical direction by means of bolt 18 carried by stand member 12. The tension on spring 22 can be adjusted by loosening bolt 18 and moving connection arm 16 upwardly or downwardly, as desired. The handle 30 of a fishing rod is slidably received in the open forward end of receiver 20 and is supported in the receiver.

The lower end of stand 12 can be inserted into any desired receiver for supporting the stand. For example, the lower end 15 of stand 12 may also include a cylindrical body 13 so the assembly can be slidably received in a tubular holder 50 (which can be supported in a boat, for example).

The tubular receiver 50 may be elongated for insertion into soft sand for surf fishing and can be locked into a desired position by means of locking pin 17 received in elongated slot 52 or into one of the holes 53 in receiver 50. Other useful types of support mounts for the stand are described, for example, in U.S. Pat. Nos. 5,088,224 and 5,187,892, incorporated herein by reference.

Figure 8:
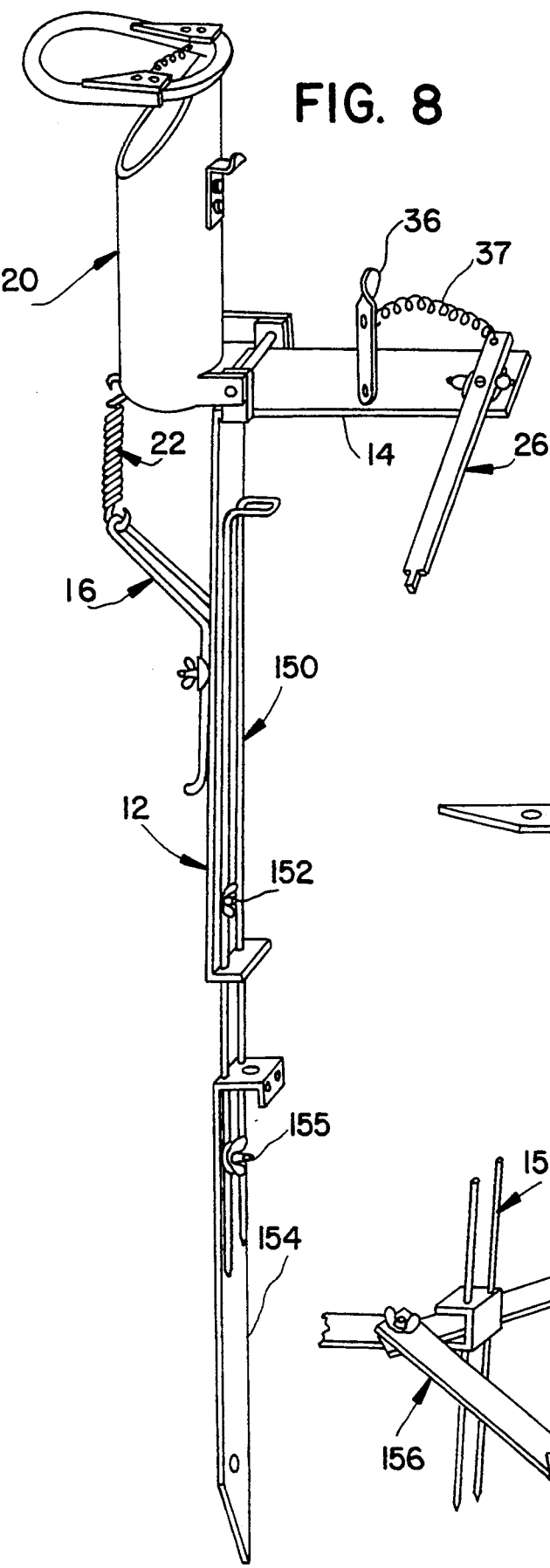
FIG. 8 is a perspective view of another embodiment of apparatus of the invention.
Figure 9:
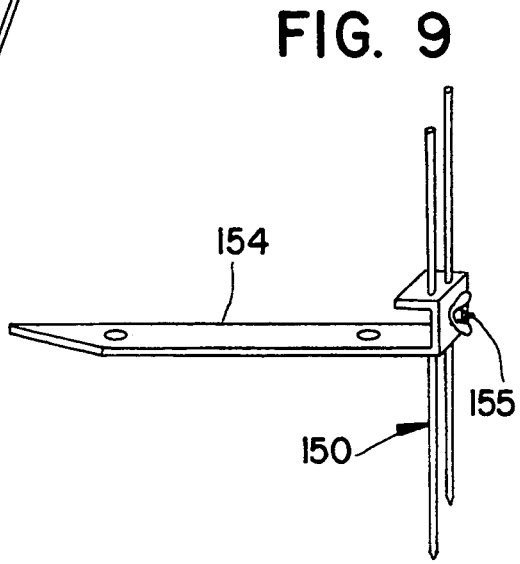
FIGS. 9 and 10 show other versions of stands which are useful in connection with the rod holders of this invention.
Figure 10:
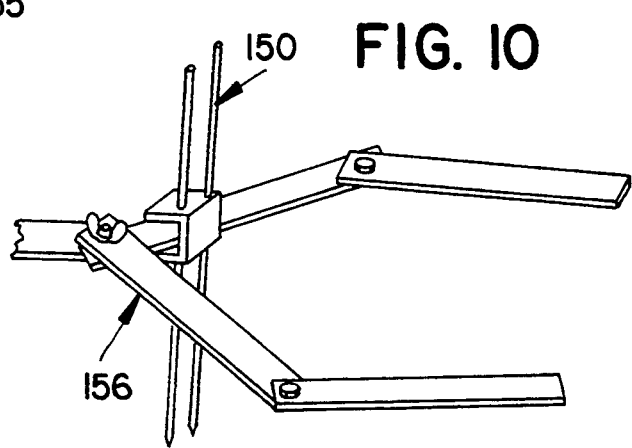

FIGS. 8, 9 and 10 illustrate other useful support mounts for the fishing rod holder. For example, the stand member 12 may include elongated leg system 150 adjustably secured to stand 12 by means of bolt 152. The legs can be slidably received in a tapered stake 154 and secured with bolt 155, either in a vertical manner (FIG. 8) or horizontal manner (FIG. 9). The legs 150 can also be inserted into a folding support 156 as shown in FIG. 10.

Projecting forwardly from the upper end of stand member 12 is an arm member 14 (which may be integral with stand 12). The trigger mechanism and the sensitivity adjustment means is carried on arm 14. The trigger means 26 comprises an elongated arm or lever which is pivotably mounted to arm 14 by means of bolt or pin 28. Projecting outwardly from one side of the lever is a roller 27. Another roller 27A may also be included on the lever projecting outwardly from the opposite side, if desired, for right or left trigger release, as desired.

When the tubular receiver 20 is in its lowered position (shown in FIG. 1), the roller 27 is positioned over latch means 23 secured to the underside of tubular receiver 20. In this manner the receiver 20 is retained in its lower position and spring 22 is tensioned. The fishing line 32 on the fishing rod is extended around the free end 26A of the trigger lever. When a fish pulls on the line (e.g., by taking the bait), the pulling force causes the trigger to be moved forwardly. This causes the roller 27 to move away from latch 23, whereby spring 22 causes the tubular receiver to pivot upwardly about pin 24 to raise the fishing rod and provide a pulling force on the line to set the hook on the fish. The U-shaped retainer rod 21 prevents the fishing rod from coming out of the tubular holder 20 during a backward movement of the fishing rod. This provides a safety feature to prevent the fingers 42 from coming into contact with anything during release of the holder 20 by trigger 26. Rod 21 is preferably covered with a plastic or rubber tubing. The hold and release fingers 42 are pivotably mounted to the forward end of holder 20 by means of screws 42A. When a fishing rod is placed in the holder 20 and urged downwardly against cable or spring 43, the fingers 42 pivot towards each other to grip the fishing rod.

In the drawings the trigger 26 is shown projecting outwardly to one side of the arm 14. If it is desired to instead have the trigger project outwardly to the opposite side of arm 14, this may be easily done. In such event the roller 27A would engage latch 23 when the receiver 20 is in its lower position.

The sensitivity of the trigger means may be easily controlled and adjusted. Lever 36 is pivotably attached to arm 14 by bolt 38 and spring 37 is connected between lever 36 and end 26B of trigger 26. The tension of spring 37 reduces the amount of pulling force required in order to move trigger 26 from its first position (where roller 27 engages latch 23) to its second position (where the roller is out of engagement with latch 23). By increasing the tension on spring 37, the amount of pulling force required to move the trigger 26 is decreased.

Spring 37 will also cause trigger 26 to pivot and release holder 20 when there is a downward pull on the fishing rod, even when the fishing line is not looped around end 26A of trigger 26. The sensitivity of this action may be adjusted by loosening bolt 38 and moving lever 36 away from or toward trigger 26.

If desired, an audio alarm means 40 may be included on the apparatus. For example, it may be carried on the upright stand 12, as shown. The audio alarm may comprise a battery 144, an audio alarm (buzzer) 142, a plate member 140, and threaded screw 146. The alarm is wired such that when the stand 12 is deflected (e.g., by a fish pulling on the line) an electrical circuit is completed and the alarm is activated.

Figure 7:
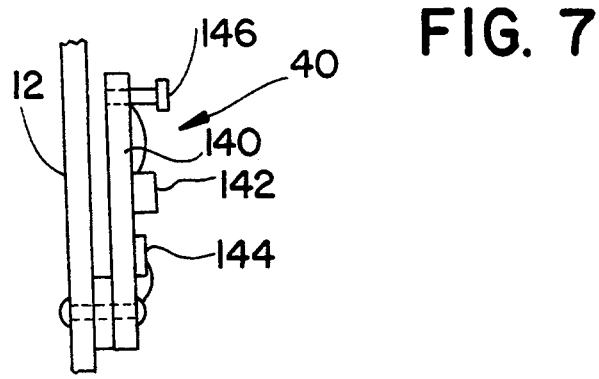
FIG. 7 is a side elevational view of one embodiment of alaram system useful in the apparatus of this invention.

FIG. 7 shows the alarm system in more detail. The plate 140 is secured at one end to the arm 12 (with a conductive screw or bolt). The battery, buzzer and threaded bolt 146 are connected together on plate 140 in series. When the arm 12 is deflected slightly toward the free end of plate 140 and comes into contact with the screw or bolt 146, an electrical circuit is completed and the buzzer is activated to sound an audible alarm. By moving the end of bolt 146 closer to arm 12, the alarm system becomes more sensitive to slight deflections of arm 12.

Figure 4:
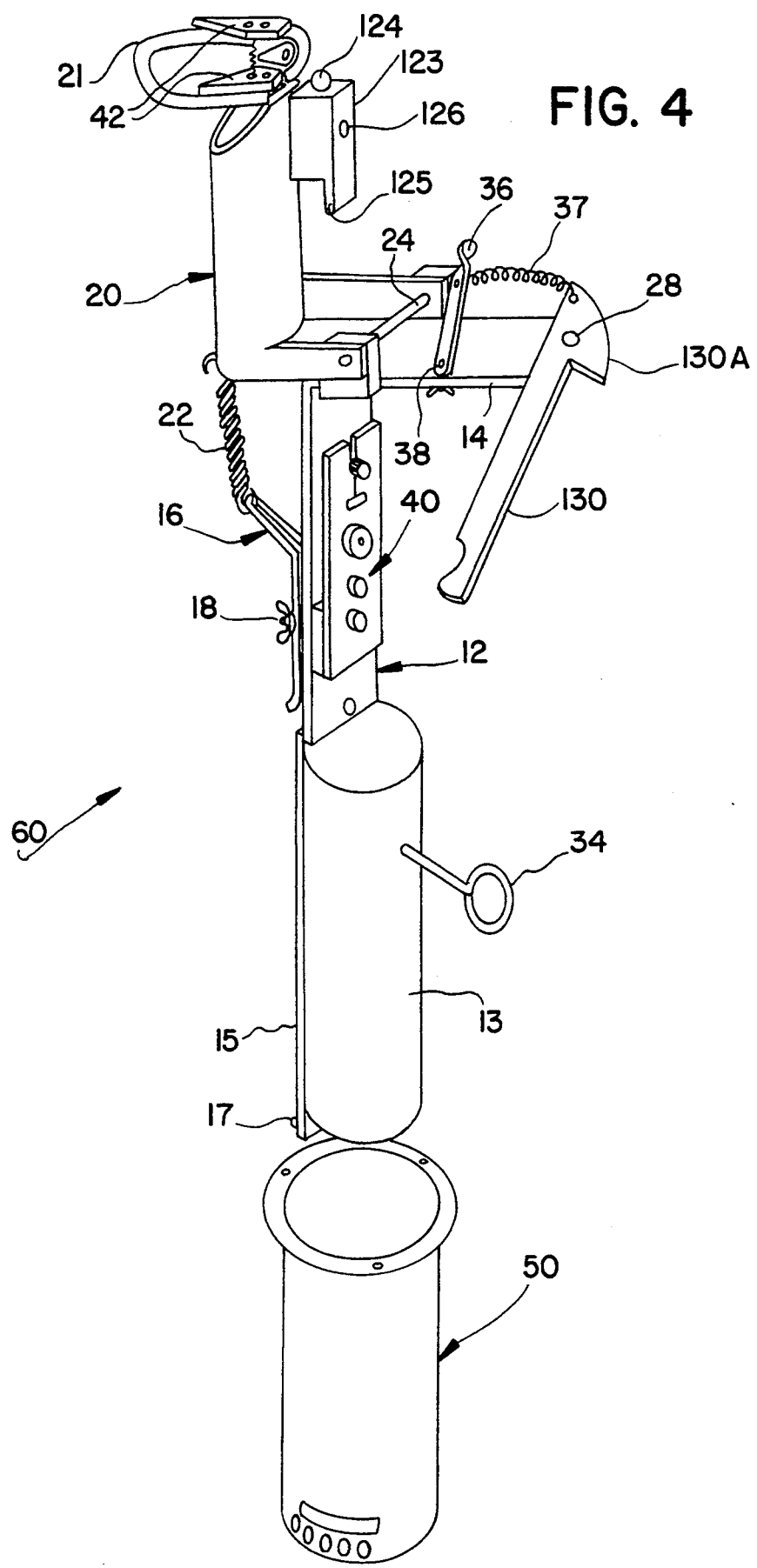
FIG. 4 is a perspective view of another embodiment of fishing rod holder of the invention.

In FIG. 4 there is illustrated another embodiment of fishing rod holder 60 of the invention. In this embodiment the trigger mechanism and the latch means are different from those used in the embodiment of FIG. 1. Thus, the latch means 123 comprises a block member which is pivotably secured to the underside of tubular receiver 20 by bolt 126. One end of the block member includes a ledge portion 125 and the opposite end of the block member includes a roller 124. By pivoting the block member about bolt 126, either the ledge portion or the roller are available for engaging the arcuate portion 130A of trigger 130. This is illustrated in FIGS. 5 and 6.

Figure 5:
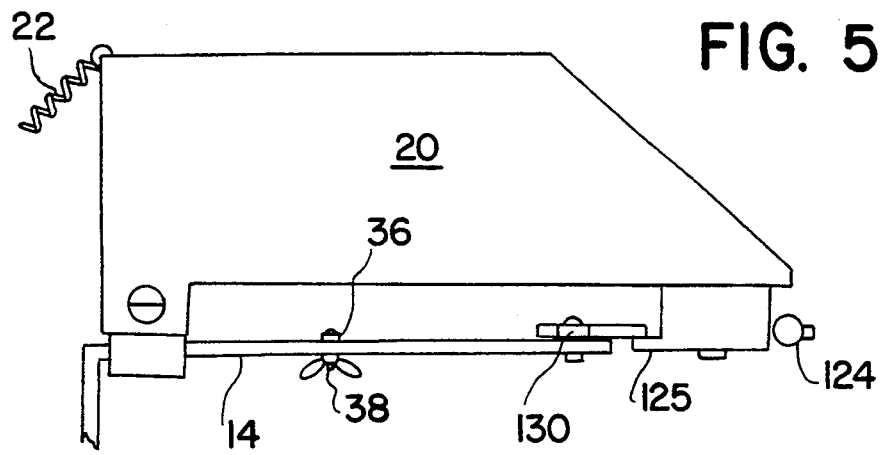
FIGS. 5 and 6 are side elevational views showing the fishing rod holder of FIG. 4 using alternative latch means.

The advantage of using latch means 123 in FIG. 5 is that it provides greater holding strength between ledge portion 125 and trigger 130 when the tension on spring 22 is increased to compensate for heavier or larger fishing rods.

Figure 6:
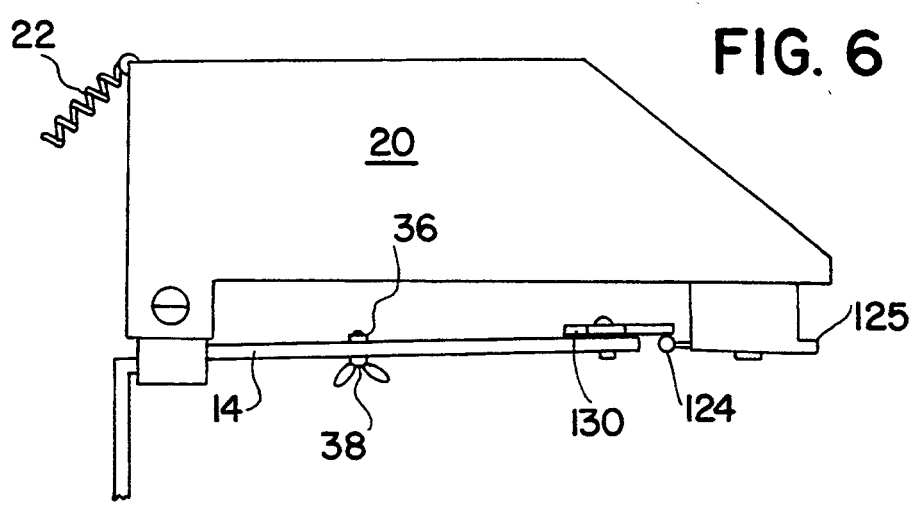

FIG. 6 illustrates roller 124 engaging trigger 130. The roller releases easier than ledge portion 125 (FIG. 5) but it does not offer the strength provided by ledge 125.

Another important feature of the fishing rod holder of this invention is that means are provided to prevent the tubular receiver 20 (and thus the fishing rod supported in the receiver) from pivoting rearwardly to an undesirable extent. In previously described spring-loaded rod holders, the receiver portion can pivot rearwardly to such an extent that the fishing rod supported in the receiver can strike a person standing or sitting behind the holder. This can cause injury and is very undesirable.

In the fishing rod holder of this invention, the spring means 22 limits the extent to which the tubular receiver 20 can pivot rearwardly. Thus, as the spring 22 pulls the tubular receiver upwardly and rearwardly, the coils of the spring move closer together. When the coils are all in contact with one another, the spring no longer presents a pulling force on the tubular receiver and the spring cannot be compressed any further. This prevents the receiver from continuing to pivot rearwardly beyond that point. This is an important safety feature.

Other means may also be used for limiting the extent or range of rearward pivoting of the tubular receiver. For example, a stop bar 11 secured to stand 12 (as illustrated in FIG. 2) may be included to prevent the tubular receiver from pivoting rearwardly beyond a predetermined point.

Other variants are possible without departing from the scope of the invention. The length and diameter of the tubular receiver may vary, as desired, to accommodate fishing rods of different sizes. Preferably the tubular receiver has an oval cross-section.

What is claimed is:

1. A fishing rod holder for supporting a fishing rod and automatically lifting said fishing rod in response to pulling motion on the fishing line carried by said fishing rod, the rod holder comprising in combination:
   (a) a tubular receiver having forward and rearward ends; wherein said forward end is open to slidably receive and support said fishing rod;
   (b) an upright stand member having upper and lower ends; wherein said rearward end of said tubular receiver is hingedly attached to said upper end of said stand member and is movable between lower and upper positions;
   (c) spring means having first and second ends; wherein said first end is secured to said rearward end of said tubular receiver, and wherein said second end is attached to said stand member in a manner such that the tension in said spring means may be adjusted; wherein said spring means biases said tubular receiver toward said upper position;
   (d) an elongated arm member having first and second ends; wherein said first end of said arm member is secured to said upper end of the stand member; wherein said arm member projects forwardly from said stand member;
   (e) latch means carried by the tubular receiver;
   (f) trigger means pivotably carried by the second end of said arm member; said trigger means being movable between (1) a first position engaging said latch means when said tubular receiver is in said lower position, and (2) a second position out of engagement with the latch means; wherein said trigger means is movable from said first position to said second position by a pulling force on said fishing line; and
   (g) sensitivity adjustment means for adjusting the amount of force required to move said trigger means from said first position to said second position; wherein said adjustment means comprises: (1) trigger spring means connected between said trigger means and said arm member; and (2) an adjustment lever, pivotably attached to said arm member; wherein said trigger spring means is connected to said adjustment lever.

2. A fishing rod holder in accordance with claim 1, wherein said tubular receiver has an oval cross-section.

3. A fishing rod holder in accorance with claim 1, further comprising a spring connection arm secured to said stand member and projecting rearwardly from said stand; wherein said second end of said spring means is attached to said connection arm.

4. A fishing rod holder in accordance with claim 3, wherein said connection arm is vertically adjustable relative to said stand member.

5. A fishing rod holder in accordance with claim 1, further comprising means for limiting the extent of rearward movement of said tubular receiver in said upper position.

6. A fishing rod holder in accordance with claim 1, further comprising alarm means carried by said stand member for emitting a signal in response to deflection of said stand member.

7. A fishing rod holder in accordance with claim 6, wherein said alarm means comprises a buzzer and a battery.

8. A fishing rod holder in accordance with claim 1, further comprising a leg member attached to said stand member and being vertically adjustable.

9. A fishing rod holder in accordance with claim 1, further comprising a pair of opposing fingers pivotably mounted to said forward end of said tubular receiver for grasping a fishing rod supported in said holder.

10. A fishing rod holder in accordance with claim 1, further comprising U-shaped retainer means secured to said forward end of said tubular receiver.

11. A fishing rod holder in accordance with claim 10, further comprising alarm means carried by said stand member for emitting a signal in response to deflection of said stand member.

12. A fishing rod holder in accordance with claim 11, wherein said alarm means comprises a buzzer and a battery.

13. A fishing rod holder for supporting a fishing rod and automatically lifting said fishing rod in response to pulling motion on the fishing line carried by said fishing rod, the rod holder comprising in combination:
   (a) a tubular receiver having forward and rearward ends; wherein said forward end is open to slidably receive and support said fishing rod;
   (b) an upright stand member having upper and lower ends; wherein said rearward end of said tubular receiver is hingedly attached to said upper end of said stand member and is movable between lower and upper positions; said stand member further comprising a connection arm projecting rearwardly from said stand member and being vertically adjustable;
   (c) spring means having first and second ends; wherein said first end is secured to said rearward end of said tubular receiver; and wherein said second end is attached to said connection arm; wherein said spring means biases said tubular receiver toward said upper position;
   (d) an elongated arm member having first and second ends; wherein said first end of said arm member is secured to said upper end of the stand member; wherein said arm member projects forwardly from said stand member;
   (e) latch means carried by the tubular receiver;
   (f) trigger means pivotably carried by the second end of the arm member; said trigger means being movable between (1) a first position engaging said latch means when said tubular receiver is in said lower position, and (2) a second position out of engagement with the latch means; wherein said trigger means is movable from said first position to said second position by a pulling force on said fishing line; and (g) sensitivity adjustment means for adjusting the amount of force required to move said trigger means from said first position to said second position; wherein said adjustment means comprises: (1) trigger spring means connected between said trigger means and said arm member; and (2) an adjustment lever, pivotably attached to said arm member; wherein said trigger spring means is connected to said adjustment lever.

14. A fishing rod holder in accordance with claim 13, further comprising a leg member attached to said stand member and being vertically adjustable.

15. A fishing rod holder in accordance with claim 13, further comprising a pair of opposing fingers pivotably mounted to said forward end of said tubular receiver for grasping a fishing rod supported in said holder.

* * * * *